March 25, 1924. Re. 15,801
R. RYCHIGER
SEMIAUTOMATIC FIREARM
Original Filed Dec. 9, 1914 6 Sheets-Sheet 1
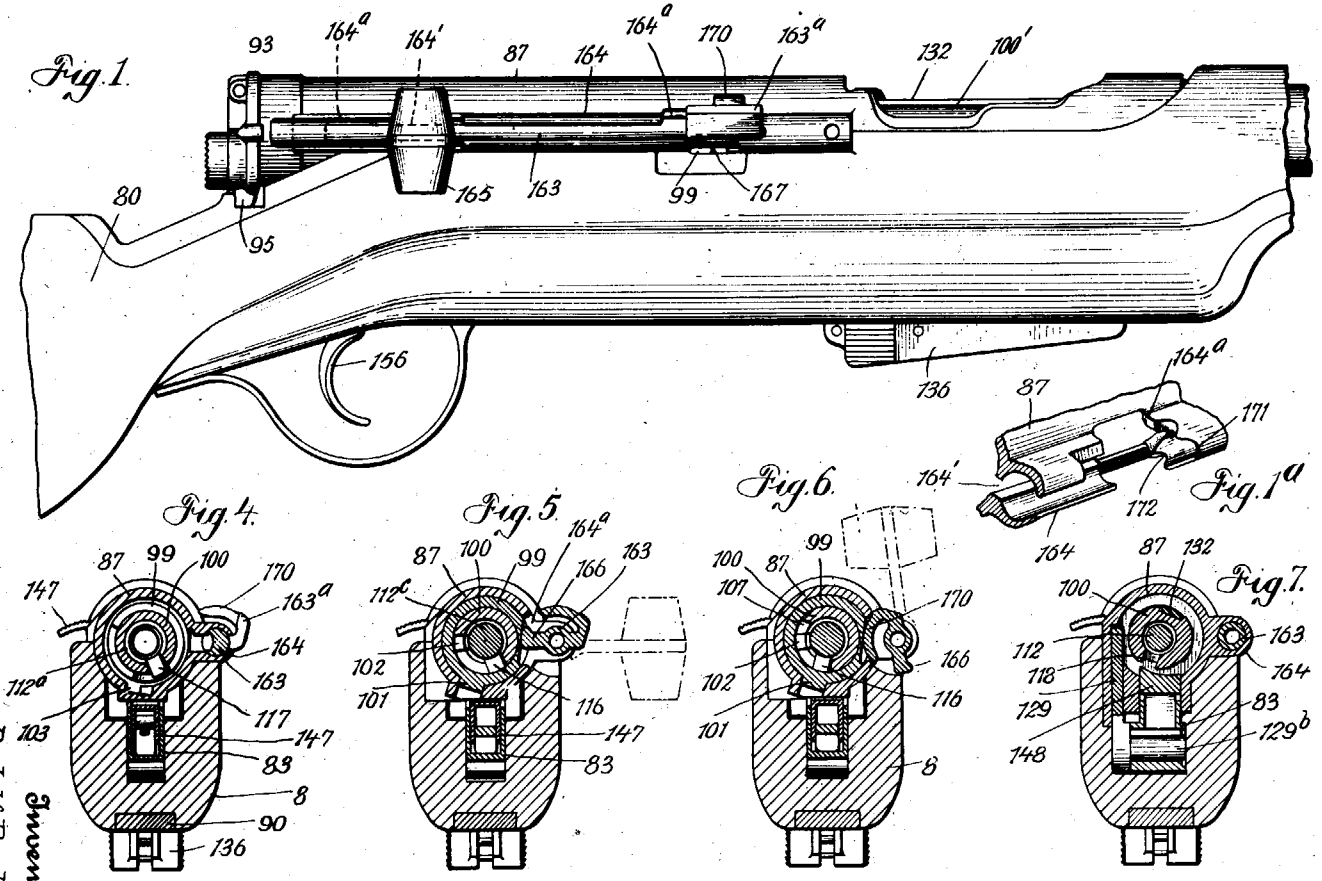
Inventor
Rudolf Rychiger
By his Attorneys
Richards & Geier March 25, 1924. Re. 15,801
R. RYCHIGER
SEMIAUTOMATIC FIREARM
Original Filed Dec. 9, 1914 6 Sheets-Sheet 2
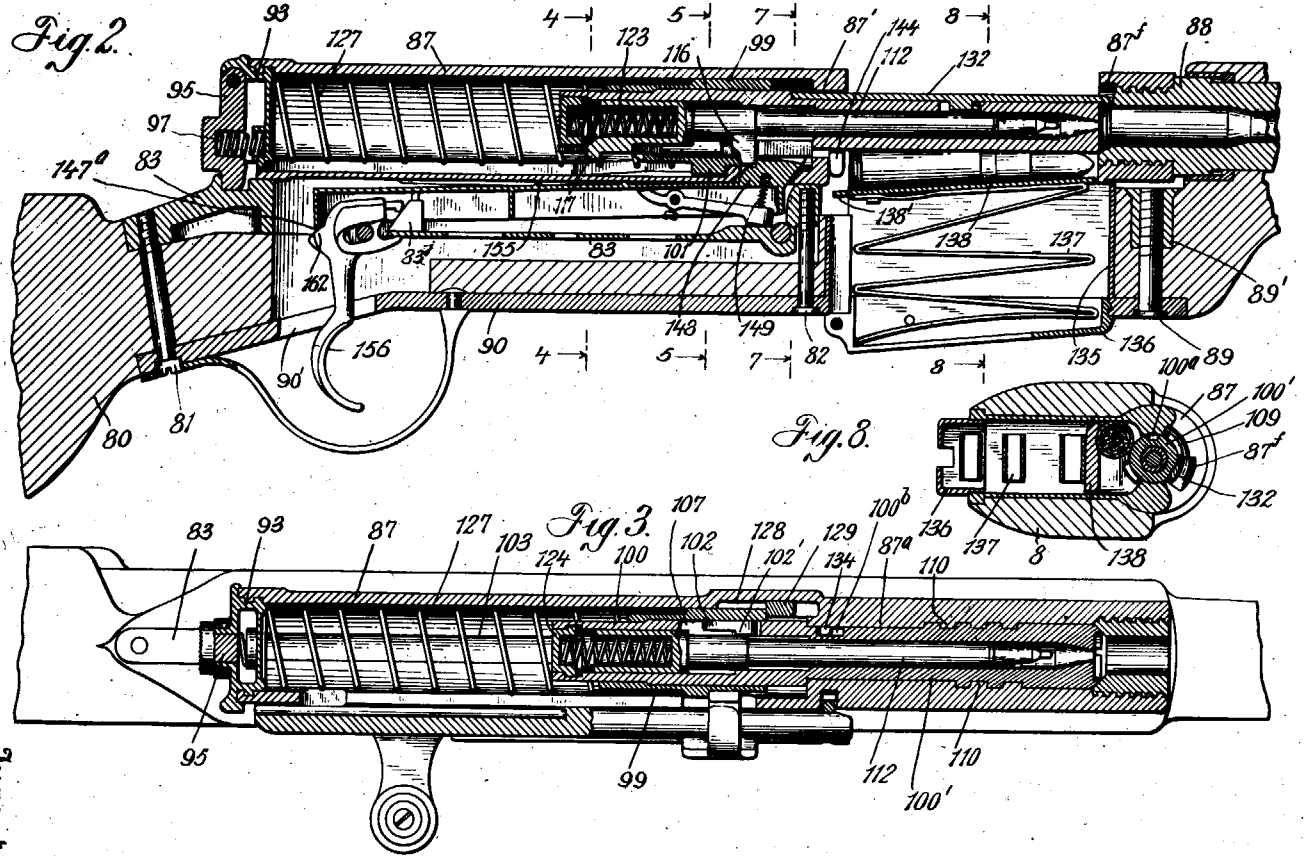
Inventor
Rudolf Rychiger
By his Attorneys
Richards & Geier March 25, 1924. Re. 15,801
R. RYCHIGER
SEMIAUTOMATIC FIREARM
Original Filed Dec. 9, 1914 6 Sheets-Sheet 3
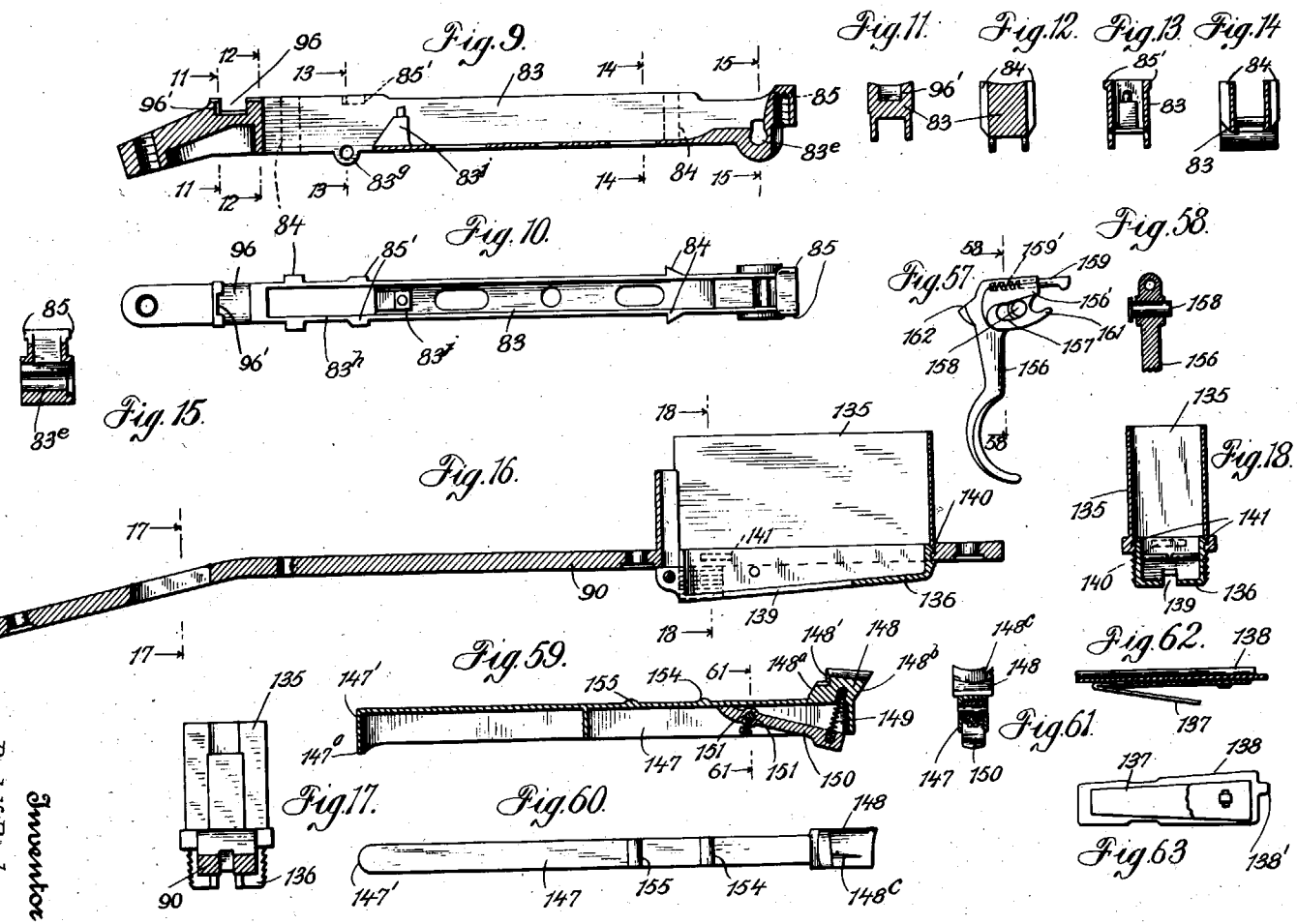
Inventor
Rudolf Rychiger
By his Attorneys
Richards & Geier March 25, 1924. Re. 15,801
R. RYCHIGER
SEMIAUTOMATIC FIREARM
Original Filed Dec. 9, 1914 6 Sheets-Sheet 4
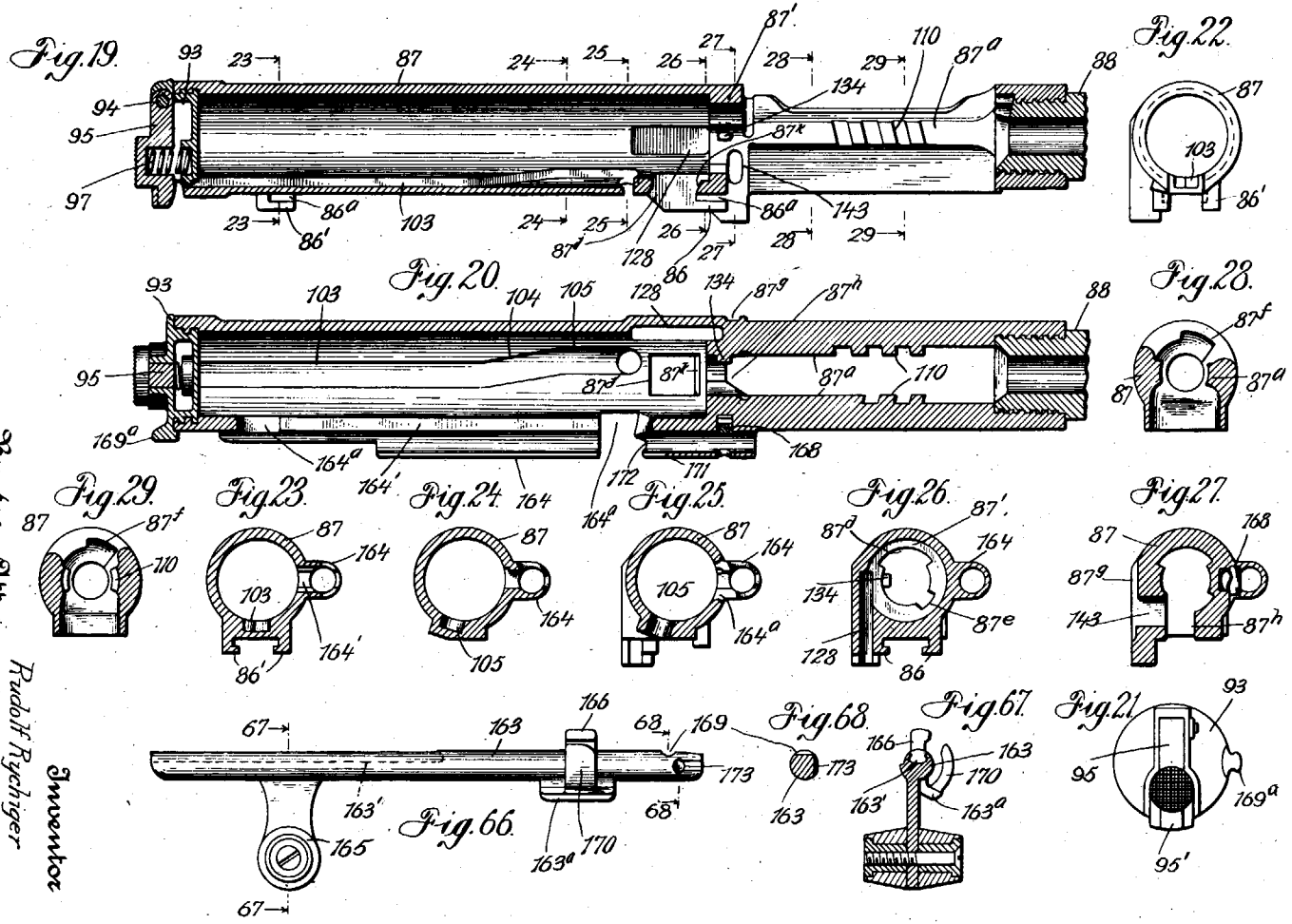
Inventor
Rudolf Rychiger
By his Attorneys
Richards & Geier March 25, 1924. Re. 15,801
R. RYCHIGER
SEMIAUTOMATIC FIREARM
Original Filed Dec. 9, 1914 6 Sheets-Sheet 5
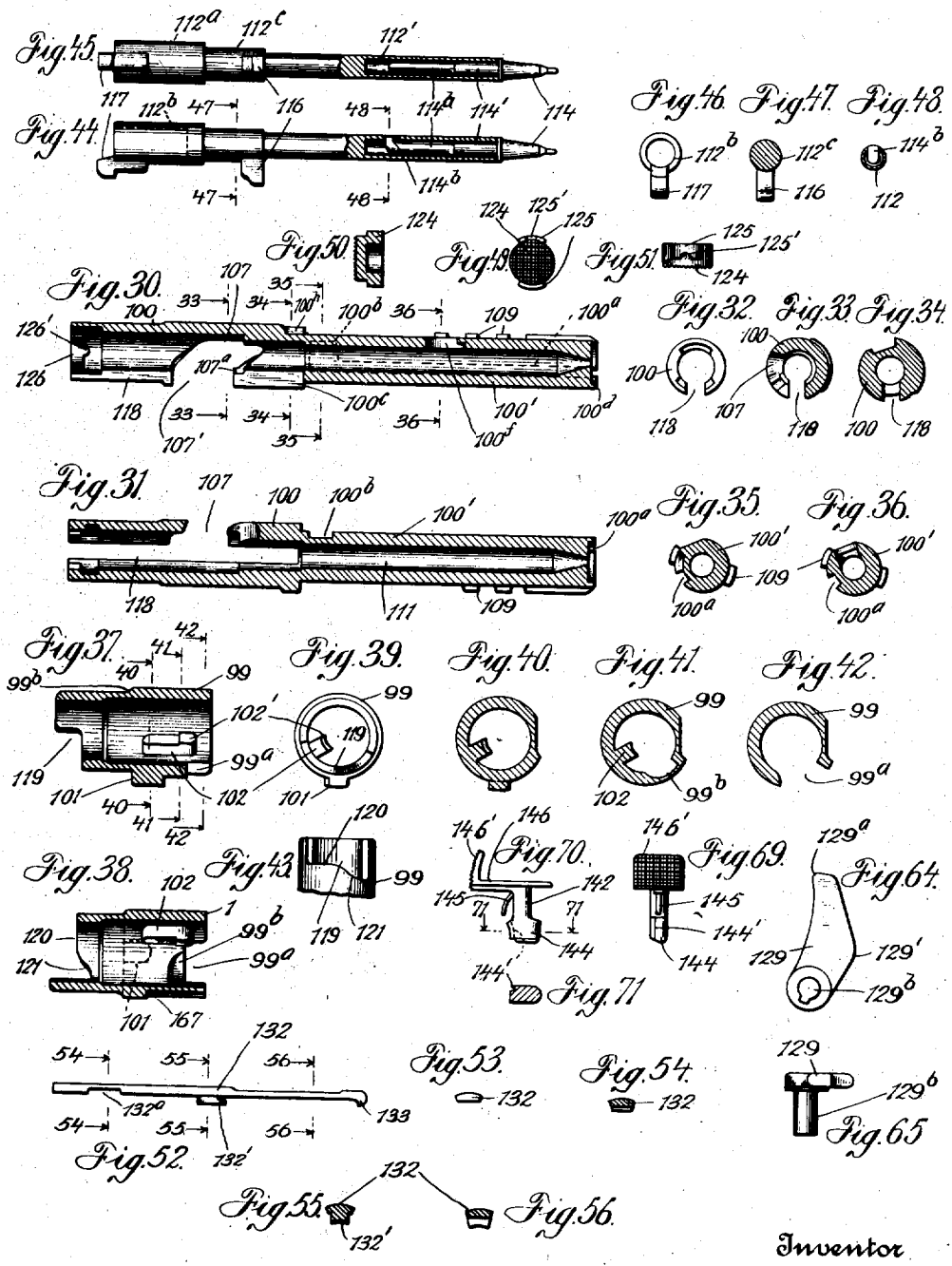
Inventor
Rudolf Rychiger
By his Attorneys
Richards & Geier March 25, 1924. Re. 15,801

R. RYCHIGER

SEMIAUTOMATIC FIREARM

Original Filed Dec. 9, 1914 6 Sheets-Sheet 6

Inventor

Rudolf Rychiger

By his Attorneys

Richards & Geier

Reissued Mar. 25, 1924. Re. 15,801

UNITED STATES PATENT OFFICE.

RUDOLF RYCHIGER, OF THUN, SWITZERLAND.

SEMIAUTOMATIC FIREARM.

Original No. 1,135,722, dated April 13, 1915, Serial No. 876,242, filed December 9, 1914. Application for reissue filed January 21, 1921. Serial No. 439,025.

*To all whom it may concern:*

Be it known that I, RUDOLF RYCHIGER, a citizen of the Federal Republic of Switzerland, and a resident of Thun, in the Canton of Berne, Switzerland, have invented certain new and useful Improvements in Semi-automatic Firearms, of which the following is a specification.

The present invention relates to that class of firearms in which the recoil, due to the firing of a cartridge, is utilized to open the breech, extract and eject the empty shell, insert a fresh cartridge from the magazine into the barrel, close the breech and cock the piece.

The main object of the present invention is to produce an improved semi-automatic firearm, specially adapted for military service, having a novel improved construction in which the recoil causes the barrel with receiver and the complete breech-closing parts therein to recoil together, while interlocked, a limited distance, the backward movement of the barrel with receiver being then arrested and the breech-closing parts in the receiver unlocked and caused to continue their recoil alone, within the receiver, compressing a resisting action spring by which the complete breech-closing parts are returned to the forward firing position.

The breech-closing parts consist only of a few members and the firearm is easily assembled or dismounted without requiring any tools.

Another main object of the invention is to provide improved means for locking and unlocking a breech-bolt of the type which locks and unlocks by a rotary movement, which means is light and inexpensive and effects the desired result with certain ease and freedom.

A further main object of the invention is to provide a simple device to lock the firing pin in its position of full cock, if necessary, thereby avoiding accidental or unintentional firing and at the same time an unintentional opening of the rifle.

With these and other objects in view, which will more fully appear as the nature of the invention is better understood, the same consists in the combination, arrangement and construction of parts hereinafter fully described, pointed out in the appended claims, and illustrated in the accompanying drawings, it being understood that many changes may be made in the size and proportion of the several parts and details of construction within the scope of the appended claims without departing from the spirit or sacrificing any of the advantages of the invention.

This self-loading rifle system (semi-automatic) is based upon the following principles:—

As with every rifle, the firing of a cartridge causes a recoil. This recoil serves in this system to unlock the breech-closing parts. The recoil causes the barrel with receiver to move backward upon a raceway together with the complete breech-closing parts in the receiver consisting of breech-bolt carrier, breech-bolt, extractor, firing pin, firing pin spring and end-piece in the breech-bolt, as well as the safety rod, bolt-stop, sear and the end-piece on the receiver.

By this backward movement the receiver hits against a lever, pivoted at its lower end in the race-way, the point of impact being first on its head or outer end, but on account of the curved shape of the lever, this point of impact is transferred more and more toward the fulcrum point, until it is near the center, thus effecting a strong accelerating velocity of the lever head.

This lever works on the carrier which latter is guided in the receiver and is always on the breech-bolt, which latter is therefore forced to slide backward also.

The explosion of a cartridge gives the barrel with receiver such a blow that it recoils upon the raceway, together with the complete breech-closing parts therein, with great velocity.

The great momentum of the recoiling receiver is then transmitted to the accelerating lever, whose upper part is thus forced to swing with progressive accelerating velocity, giving the carrier such a powerful impulse, that the latter slides backward, unlocks the breech-bolt from the receiver and afterwards forces the unlocked breech-bolt and the whole breech-closing parts backward with sufficient force, to move backward in the receiver against a resisting action spring a sufficient distance to eject a cartridge, the compression produced in the resisting action spring being sufficient to cause the breech-closing parts to be pushed forward again to the firing position, at the same time inserting a cartridge into the barrel.

The invention is illustrated in the accompanying drawings, in which:—

Figure 1 is a side elevation of the central portion of a rifle, constructed in accordance with the present invention;

Figure 1[a] is a fragmentary perspective view of a portion of the receiver.

Figure 2 is a vertical section taken through the portion of the rifle shown in Fig. 1;

Figure 3 is a horizontal section taken through the same;

Figure 4 is a section taken on line 4—4 of Figure 2;

Figure 5 is a section taken on line 5—5 of Figure 2;

Figure 6 is a section taken on the same line with the safety mechanism in its operative position;

Figure 7 is a section taken on line 7—7 of Figure 2;

Figure 8 is a section taken on line 8—8 of Figure 2;

Figure 9 is a vertical section taken through the base plate or raceway on which the receiver, actuated by the recoil, moves;

Figure 10 is a plan view of the same;

Figure 11 is a section taken on line 11—11 of Figure 9;

Figure 12 is a section taken on line 12—12 of Figure 9;

Figure 13 is a section taken on line 13—13 of Figure 9;

Figure 14 is a section taken on line 14—14 of Figure 9;

Figure 15 is a section taken on line 15—15 of Figure 9;

Figure 16 is a vertical longitudinal section taken through the magazine carrying plate of the rifle;

Figure 17 is a section taken on line 17—17 of Figure 16;

Figure 18 is a section taken on line 18—18 of Figure 16;

Figure 19 is a central vertical section taken longitudinally through the receiver of the rifle;

Figure 20 is a horizontal section taken therethrough;

Figure 21 is a face view of the end piece closing the receiver;

Figure 22 is a rear end view of the receiver;

Figure 23 is a section taken on line 23—23 of Figure 19;

Figure 24 is a section taken on line 24—24 of Figure 19;

Figure 25 is a section taken on line 25—25 of Figure 19;

Figure 26 is a section taken on line 26—26 of Figure 19;

Figure 27 is a section taken on line 27—27 of Figure 19;

Figure 28 is a section taken on line 28—28 of Figure 19;

Figure 29 is a section taken on line 29—29 of Figure 19;

Figure 30 is a vertical longitudinal section taken through the breech-bolt;

Figure 31 is a horizontal, vertical section taken therethrough;

Figure 32 is an end view thereof;

Figure 33 is a section taken on line 33—33 of Figure 30;

Figure 34 is a section taken on line 34—34 of Figure 30;

Figure 35 is a section taken on line 35—35 of Figure 30;

Figure 36 is a section taken on line 36—36 of Figure 30;

Figure 37 is a vertical longitudinal section taken through the breech-bolt carrier;

Figure 38 is a horizontal longitudinal section taken therethrough;

Figure 39 is an end view thereof;

Figure 40 is a section taken on line 40—40 of Figure 37;

Figure 41 is a section taken on line 41—41 of Figure 37;

Figure 42 is a section taken on line 42—42 of Figure 37;

Figure 43 is a plan view of a portion of the breech-bolt carrier;

Figure 44 is a side elevation, partly in section, of the firing pin;

Figure 45 is a plan view thereof; partly in section;

Figure 46 is an end view of the same;

Figure 47 is a section taken on line 47—47 of Figure 44;

Figure 48 is a section taken on line 48—48 of Figure 44;

Figure 49 is a rear elevation of the end-piece of the breech-bolt;

Figure 50 is a vertical section taken therethrough;

Figure 51 is a plan view of the same;

Figure 52 is a side elevation of the shell extractor;

Figure 53 is a front elevation thereof;

Figure 54 is a section taken on line 54—54 of Figure 52;

Figure 55 is a section taken on line 55—55 of Figure 52;

Figure 56 is a section taken on line 56—56 of Figure 52;

Figure 57 is a side elevation of the trigger;

Figure 58 is a section taken on line 58—58 of Figure 57;

Figure 59 is a vertical longitudinal section taken through the sear of the trigger apparatus;

Figure 60 is a plan view thereof;

Figure 61 is a section taken on line 61—61 of Figure 59;

Figure 62 is a section of the magazine follower;

Figure 63 is a bottom plan view of the same;

Figure 64 is a side elevation of a lever forming the connecting means between the receiver and the breech-bolt carrier;

Figure 65 is a plan view of the same;

Figure 66 is a top or plan view of the safety device and the manual breech-bolt operating means of the firearm;

Figure 67 is a section taken on line 67—67 of Figure 66;

Figure 68 is a section taken on line 68—68 of Figure 66;

Figure 69 is a side elevation of the means for holding the breech-bolt in its open position after the last cartridge in the magazine has been fired;

Figure 70 is a front elevation of the same;

Figure 71 is a section taken on line 71—71 of Figure 70;

Figure 72:
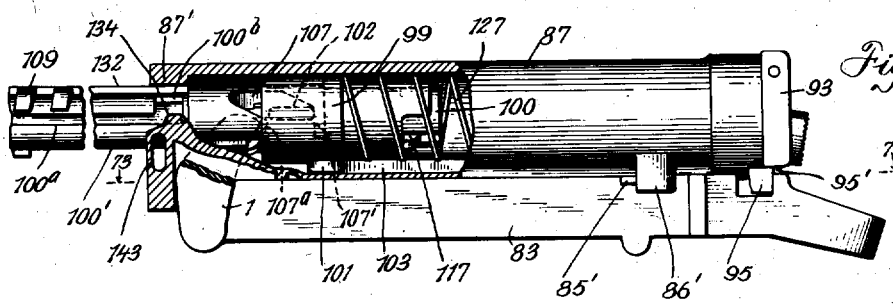
Figure 72 is a detail side elevation, with parts broken away, looking in the opposite direction of Figures 1 and 2 and showing the receiver in recoiled position on the raceway and the breech-bolt rotated by the rearward movement of the carrier to the unlocking position.
Figure 74:
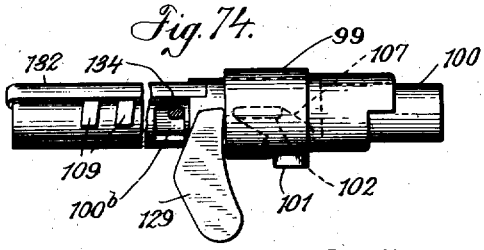
Figure 74 is a detail side view of the breech-bolt and carrier, looking in the same direction as Figure 72, with the breech-bolt locked, the accelerating lever being shown in position.
Figure 75:
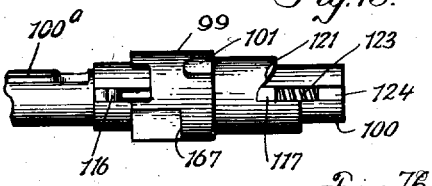
Figures 75 to 77 are detail elevational views showing the manner in which the carrier sets the firing pin.
Figure 76:
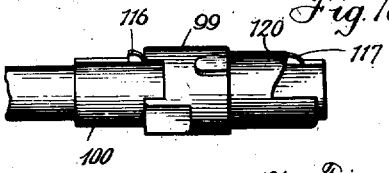

In the drawings, the numeral 80 indicates the stock of the firearm which is suitably recessed on its upper side to receive an elongated base block or raceway 83 (see Figures 2, 4 to 7, 9 to 15, and 74). This raceway is attached to the stock by headed screws 81 and 82, passing freely upwardly through the stock and threaded into suitable tapped borings at opposite ends of the raceway, these screws also serving to hold the plate supporting the trigger guard and magazine in position as will be later pointed out. This raceway is of channel shape in cross section throughout the main portion of its length to receive the sear as will be later set forth.

Upon the sides of this raceway are formed projections 84 which extend from top to bottom thereof and fit into mortises in the stock to properly position, in assembling, the said raceway on the stock. These projections also serve to transmit the recoil of the barrel, which is initially received by the raceway, to the stock.

This raceway has also formed upon the sides thereof and flush with the top thereof, two pairs of laterally projecting lugs of which there are a front pair 85 and rear pair 85′, the former being located at the extreme front end of the raceway and the latter a short distance in front of the rear pair of projections 84. This raceway supports the barrel extension or receiver 87, which is of substantially cylindrical shape (see Figures 1 to 8, 19 to 27, 72 and 73) and is provided toward opposite ends with two pairs of downwardly projecting lugs 86, 86′ whose inner faces are spaced laterally in correspondence with the sides of the receiver and have grooves 86ª formed therein, these grooves extending from the front edges of the lugs partially rearwardly therethrough. When assembling, the receiver is laid on the raceway with the lugs 86, 86′ behind the ears 85, 85′ and is then moved forwardly until the grooves 86ª engage over the ears. As will be apparent, disengagement of the receiver in a forward direction is prevented by the rear walls of the grooves, while the receiver is prevented from moving backward a sufficient distance to disengage the grooves from the ears by the end-piece of the receiver when the latter is in position as will be later pointed out. Extending along the underside of the stock 80 is a plate 90, (see Figures 2, 16 to 18) which supports the trigger guard and magazine and which is held in place by the screws 81 and 82 above mentioned which pass upwardly through suitable counterbored apertures therein, and by a third screw 89 which passes upwardly through the forward end of the plate and is threaded into a sleeve 89′ sunk downwardly into the stock.

The receiver 87, in which are arranged the various loading, firing and extracting mechanisms, to be later described, comprises a substantially cylindrical casing, whose forward portion is longitudinally slotted on both its lower and upper sides for the admission and ejection respectively of the cartridges and shells, and which communicates in the usual manner with the barrel 88 attached thereto, an annular inturned flange 87′ being formed on the receiver just to the rear of the longitudinally slotted portion.

The rear end of the receiver is closed by an end-piece 93 that is preferably screwed into the same and has pivoted to the upper side thereof, as at 94ª, downwardly projecting lever 95 arranged to swing longitudinally of the rifle, the lower end of this lever projecting downwardly beyond the receiver into a transverse groove 96 formed in the upper side of the rear end of the raceway 83, the lower end of the lever having a projection 95′ which engages in a notch 96′ in the rear wall of the groove 96. This lever 95 is also provided with a portion 95′ forming a thumb-piece, adapted to be engaged to press the lever inwardly. Carried in suitable sockets in this lever and the end-piece 93 is a coiled compression spring 97, this spring serving both to cushion the recoil and return the barrel with receiver, as will be later set forth, and also to hold the lever 95 in position, retaining the end-piece 93 against unscrewing movement by pressing the projection 95′ on the lever into the notch 96′ in the raceway, the width of the groove 96, considered longitudinally of the rifle, being sufficient to allow the lever to be pressed inwardly against the action of the spring 97 until the projection 95′ clears the notch 96′ after which by rotating the end-piece, it may be screwed into the receiver or unscrewed therefrom, thereby closing and opening said receiver, the engaging screw threads between the end-piece and receiver being preferably double flat as indicated. When the end-piece is in position, the recoiling movement of the receiver on the raceway causes the end-piece to bear against the lever 95 (see Fig. 72) before the grooves 86ᵃ in the receiver have passed from engagement with the lugs on the raceway, thus retaining the receiver on the raceway. This end piece forms with its front face, which latter is provided with a small circular groove to accommodate the rear end of an action spring 127, the abutment of this action spring and, also the limiting point of the recoiling of the complete breech-closing parts in the receiver 87.

Within the receiver is slidably mounted a breech-bolt carrier 99 (see Figures 2 to 7, 37 to 43, 72 to 77) which is also arranged to have a slight rotary movement in the receiver, this carrier being in the form of a relatively short sleeve, which fits snugly over the breech-bolt and snugly in the receiver, to the rear of the flange 87′, the breech-bolt being indicated at 100 and being of considerably greater length than the carrier 99 and being adapted to slide and rotate in the receiver 87, being supported and guided by the carrier and also by the receiver.

Formed on the outer surface of the carrier is a guide lug 101, which engages in a groove 103 extending forwardly from the rear end of the receiver with its main length in the median line of the rifle, diverging spirally from a short distance near its forward end as at 104 and finally terminating at its forward end in a straight portion 105, parallel to the main length of the groove but offset circumferentially therefrom.

The bottom of the receiver is projected downward, below the cylindrical outline thereof, to enclose the groove 103, the grooves 86ᵃ in the lugs 86, 86′ being so spaced vertically, as to bring the bottom of the receiver substantially flush with the top of the raceway. It will be apparent that, as the carrier 99 moves backward during the operation, it will be given a slight turning motion by reason of the engagement of the guide lug 101 in the groove 103, the purpose of this turn being later set forth.

The carrier 99 is also provided with an inwardly projecting lug 102 which is preferably offset circumferentially from the exterior lug 101, this lug 102 being adapted to engage and slide in a spiral slot 107 in the wall of the breech-bolt 100 toward the rear end thereof, and the longitudinal movement of the carrier causes this lug 102 to rotate the breech-bolt one-seventh of a revolution, thereby locking and unlocking the breech-bolt with the receiver.

This inwardly projecting lug 102 in the carrier has an inward extension 102′ at one end which forms a shoulder, adapted to stop the forward movement of the firing pin in case of breaking of any part of the firing device, thereby forming a safety device for the firearm.

The forward portion of the breech-bolt 100 (see Figures 1 to 8, 30 to 36, 72 to 77) is of reduced diameter as shown at 100′, forming a shoulder which is adapted to engage the inturned flange 87′ of the receiver to limit the forward movement of the breech-bolt.

This forward portion of the breech-bolt is formed with exterior mutilated screw threads 109, which mesh with interior similar screw threads 110 cut in inwardly projecting ribs 87ᵃ extending along the side of the receiver adjacent the cartridge opening, these mutilated screw threads running in an opposite direction to the spiral slot 107 in the breech-bolt. This forward portion of the breech-bolt is also provided with a longitudinal groove 100ᵃ located just under the threads on one side of the bolt, this groove having an enlarged offset 100ᵇ at its inner end. A lug 134 on the inturned flange 87′ engages in this groove, thereby holding the breech-bolt against rotation as it moves backward or forward.

The breech-bolt is provided with a bore 111 and the wall of the bolt is longitudinally slotted on one side as at 118 from the rear end thereof to the shoulder 100ᶜ, the wide spiral slot 107 communicating at one side with this longitudinal slot, thus permitting the carrier to be slipped over the breech-bolt with its interior projection passing through this slot when the parts are being assembled. The spiral slot 107 communicates with the slot 118 through a transverse portion 107′ and has in its front wall a shallow arcuate notch 107ᵃ for a purpose to be later set forth. Within the bore 111 is mounted the firing pin 112 (see Figures 1 to 8, 44 to 57, 75 to 77) which is preferably made with a detachable point 114 to permit of easy replacement in case of breakage, the main body of the pin having a boring 112′ extending rearwardly from its front end into which the shank 114′ of the point projects, this shank having a diminished extension 114ᵃ which is outturned at its end as at 114ᵇ to engage in an aperture in the wall of the pin body. By depressing this end 114ᵇ the point may be released from the pin body. The rear portion of the firing pin is enlarged as at 112ᵃ, this enlarged portion being made tubular from the rear end as at 112ᵇ to receive the firing pin spring 123, the pin having another intermediate portion 112ᶜ of somewhat less diameter than the end 112ᵃ, thus forming a shoulder.

Upon the firing pin are formed two projecting studs 116 and 117, the second of which is at the rear end of the enlarged tubular portion 112ᵃ of the firing pin, and the first is at the forward end of the intermediate portion 112ᶜ. The first or front stud 116 serves to hold the firing pin in cocked position by means of the sear head 148 while the second, or rear stud 117, which sits on the rear end of the enlarged tubular portion of the firing pin, helps to cock the firing pin by sliding upon a spiral portion on the carrier, while rotating with the breech-bolt. These two studs are disposed in the same plane and project into and beyond the slot 118 in the breech-bolt.

The firing pin 112 is normally urged forward by an expansion spring 123, also called main spring, which is seated in the tubular portion 112ᵇ of the firing pin and bears against an end-piece 124 that closes the rear end of the breech-bolt and locks the main spring 123 in the tubular portion 112ᵇ. This end-piece 124 also engages and supports the rear end of the main spring 123. This spring gives the firing pin the necessary power to strike and serves also to prevent the end-piece 124 from disengagement with the breech-bolt. This end-piece is detachable and is held upon the breech-bolt in a suitable manner as by the exterior quadrantal projections 126 in the enlarged rear end of the breech-bolt boring. A tit 126′ on one of the projections 126 engaging a notch 125′ in one of the projections 125 and thereby, under the pressure of the spring 123, holding the parts interlocked, the manner of assembling the rifle being set forth in detail later.

The rear stud 117 on the firing pin projects downwardly behind the carrier 99 and the front stud 116 projects in front of the carrier, the rear stud being engaged by the carrier in its rearward movement on the recoil to reset the firing pin. As here shown the stud 117 projects into a segmental recess 119 in the rear end of the carrier, the front edge of this recess comprising a straight portion 120 and a spiral portion 121.

The front stud 116 projects into a segmental recess 99ᵃ in the front end of the carrier, this recess being extended as at 99ᵇ to accommodate the firing pin when the latter is drawn back.

The carrier 99 and with it the breech-bolt 100 are normally urged forward by the action spring 127 which is seated in the receiver 87 and bears between the end-piece 93 and a shoulder 99ᶜ on the carrier, formed by reducing the rear part thereof.

This action spring serves to close and lock the breech-closing parts in the receiver and thus replaces the human hand.

The receiver 87 has formed in one side thereof, just to the rear of the cartridge opening, a slot 128 which extends upwardly from the bottom thereof and intersects the inside area of the barrel as clearly shown in Figs. 20 and 26. This recess accommodates and guides the accelerating lever 129 (see Figs. 64, 72 and 73) which projects at its lower end across the side of the raceway 83 at the forward end thereof, and is pivoted to the latter, the lever being fixed on a pin 129ᵇ which projects into a transverse boring 83ᵉ in the front end of the raceway. This lever 129 is shaped to present a nose 129′ on its forward side approximately midway between its ends, while its rear side is concavely curved for clearance purposes. The nose 129′ of this lever is adjacent the front wall of the slot 128 in the receiver while its end 129ᵃ projects across and adjacent the front end of the carrier. Since the fulcrum point of the lever is fixed in the lower front part of the raceway 83 it will be obvious that the recoil of the receiver will cause the lever to swing and to impart an increased or accelerated movement to the carrier 99. I therefore call this lever an accelerating lever.

The spent cartridges or shells, are removed by a resilient extractor bar 132 which is fixed upon and extends along the forward portion 100′ of the breech-bolt, the inturned flange 87′ on the receiver being checked out as at 87ᵇ and 87ᶜ to accommodate this bar and the mutilated screw threads 109, while the forward end of the receiver has a segmental check-out 87ᵗ to accommodate the hooked end 133 of the extractor. The extractor is provided with an inwardly projecting hook 133 on its forward end, that engages in the rim of the shell for withdrawing the same from the barrel as the breech-bolt moves backward, the shell being ejected by striking the lug 134 on the inturned flange 87′ of the receiver 87.

The extractor bar 132 is formed on its underside about midway between its ends with a hooked projection 132′ which engages in a complementary recess 100$^{f}$ in the forward portion 100′ of the breech-bolt, which is flattened as at 100$^{g}$ to receive the extractor bar. The rear end of the extractor bar engages in a recess 100$^{h}$ in the enlarged rear portion of the breech-bolt while adjacent its rear end the underside of the extractor bar is recessed as at 132$^{a}$. By inserting a screwdriver or like tool in the recess 132$^{a}$ the bar 132 may be sprung sufficiently to release the hooked projection 132′ from the recess 100$^{f}$ while the bar may be secured in position by inserting the projection 132′ in the recess 100$^{f}$ and forcing the end of the bar into the recess 100$^{h}$. This extractor bar is always on the breech-bolt and may be considered as a part of the same.

The cartridge magazine is disposed under the cartridge opening in the receiver and comprises the casing 135 which is fixed to the plate 90 and projects upwardly through a suitable recess in the stock. The bottom of the casing is formed by a detachable bottom member 136 to which is attached the magazine spring 137, the latter carrying a follower 138. This bottom member has an upturned surrounding flange which projects upwardly into the casing wall 135 and has an exterior lug 140 on its forward end which engages in a recess in the casing wall. The bottom is formed with a slot 139 which extends rearwardly from a point toward the front end and completely through the rear end of said bottom and its flange, thereby forming the rear portion of the bottom transversely resilient. Upon opposite sides of the flange and near the rear end of the bottom are lugs 141 similar to the lugs 140 and engaging in like recesses in the casing wall. In putting the bottom in place the lug 140 is first seated in its recess, after which the bottom is compressed transversely to permit of the seating of the lugs 141 in their recesses, the lugs springing into place as soon as the compression is removed from the bottom. The top plate or follower 138 is so constructed as to hold the cartridge in suitable position and is adapted to be fastened tight on the magazine spring 137 by means of a nose at its underside which fits into a corresponding slot in the top section of the spring 137.

Co-operating with the follower 138 is a bolt-stop adapted to hold the breech-bolt in its retracted position when the magazine has been exhausted. This bolt-stop comprises a shank 142 see Fig. 70 which projects through a vertically elongated aperture or slot 143 in the side wall of the receiver just in front of the recess 128, this shank having a vertically enlarged head 144 on its inner end which prevents its disengagement from the slot. This head has a rearwardly facing arcuate notch 144′ on its upper side which the front end of the breech-bolt engages when the head is raised. A spring 145 is carried upon the upper side of said shank 142 and bears between the latter and the upper wall of the slot 143 and normally presses the shank against the lower wall of the slot, in which position the head 144 is out of the path of the breech-bolt. Extending upwardly from the outer end of the shank 142 is a rigid arm 146 having an outturned finger piece 146′ on its upper end for depressing the bolt-stop, this arm being guided in a groove 87$^{g}$ in the side wall of the receiver. This bolt-stop is automatically actuated by the follower 138 seated on top of the magazine spring 137, this follower having a rearwardly, projecting lug 138′ which is accommodated in a notch 87$^{L}$ cut rearwardly through the bottom wall of the receiver from the cartridge opening, this lug extending under the head 144 of the bolt-stop.

When the magazine is exhausted the lug 138′ engages the head 144 and pushes the latter upwardly causing it to project in front of the bolt when the latter reaches its rearmost position, and hold the bolt against forward movement, a forwardly projecting annular flange 100$^{d}$ on the front end of the breech-bolt engaging in the recess 144′ in the head 144.

The firing pin is controlled by a sear 147 (see Figures 2, 4 to 7, 59 to 61, and 73) that is located under the receiver in the channeled raceway 83, the sear itself being partially of inverted channel cross section and of a width to fit snugly in the raceway, and being free to move longitudinally in the latter. Upon the front end of the sear is an upwardly projecting head 148 which projects upwardly through an opening 87$^{d}$ in the bottom of the receiver 87 just to the rear of the internal flange 87′ thereof, this head, extending upwardly into the receiver across the bottom wall of the carrier 99, being accommodated in the front segmental recess 99$^{a}$ of the latter; the portion of the head projecting across the wall of the carrier being formed to present a rearwardly facing vertical shoulder 148′ against which the front stud 116 of the firing pin bears, while the portion projecting across the wall of the receiver presents an inclined shoulder 148$^{a}$ which permits of a slight rearward movement of the sear relatively to the receiver. The front wall 148$^{b}$ of the head 148 is inclined upwardly and forwardly as shown, this front wall, when the rifle is cocked, resting on a downwardly and rearwardly inclined wall 87$^{k}$ formed by the front edge of the opening 87$^{d}$ in the receiver. The top of the head 148 is formed on one side with a longitudinal recess or notch 148$^{c}$ which notch is in juxtaposition with the stud 116 of the firing pin when the rifle is set for firing (see Fig. 78) the stud 116 on the firing pin sliding through said notch when the head 148 is depressed. The head slants downwardly and forwardly from the shoulder so as to allow the stud 116 on the firing pin to ride back thereover, as will be later set forth.

At its rear end the top face of the head 148 is curved concentric to the breech-bolt 100 and projects closely adjacent thereto, the head tapering laterally as well as longitudinally toward its forward end. Formed on the upper face of the sear 147 between the ends thereof are a pair of transverse ridges 154 and 155 spaced a short distance one in front of the other, these ridges being adapted to bear upwardly against the bottom of the receiver and form fulcrums upon which the sear swings, as it is acted upon by the trigger 156. These ridges form two points, the front ridge is the rocking point, the rear ridge is the working point. From the rocking point to the working point the front stud of the firing pin is set sharp to ascertain afterwards a non-sliding or grinding release of the front stud of the firing pin from the sear head 148 by pulling the trigger. The sear is normally held in position with the head 148 thereof projected up into the path of the front stud of the firing pin and with the front ridge 154 bearing on the receiver by means of a coiled expansion spring 149 seated at opposite ends respectively in sockets in the underside of the head 148 and the upper face of an abutment lever 150 pivoted near its opposite end as at 151 to the sear and enclosed between the sides of the latter, this lever having its opposite end extended beyond its pivot 151 to bear against the inner face of the sear and thus limit the outward movement of the first mentioned end of the lever under the pressure of spring 149. By mounting the spring 149 in this manner, the ready removal and replacing of the sear is permitted without touching the spring.

The rear end of the sear is closed by a semicircular end 147′ which is extended downwardly to form an arcuate heel 147ᵃ against which the trigger 156 is adapted to bear.

The trigger 156 is formed with an enlarged head 156′ in which is a downwardly and rearwardly slanting slot 157, through which the pivot pin 158 of the trigger passes, this pin being supported at its ends in two perforated lugs 83ᵍ on the underside of the raceway between which the head of the trigger is disposed, the head projecting up into the raceway and into the sear just in front of the heel 147ᵃ of the sear, through an aperture 83ʰ in the bottom of the raceway, at the rear end of the channeled portion thereof. A pin 159 is slidably mounted in a longitudinally extending socket in the upper portion of the trigger head 156′ and is pressed by a spring 159′ seated in the bottom of said socket and pressing the pin 159 against the inclined rear face of a shoulder 83ʲ; extending upwardly from the bottom of the raceway. On top of this shoulder 83ʲ is a projection, adapted to bear against the inner face of the sear 147 and forming a guide for said sear. On the lower part of the trigger head 156′ is a forwardly extending and upwardly curved finger 161 which bears against the bottom of the raceway in front of the aperture 83ʰ. It will be obvious that the pressure of the spring 159′ will act to swing the head 156′ around the pivot pin 158 and hold the finger 161 pressing upward against the bottom of the raceway and at the same time pressing the trigger head backward until the front end of the slot 157 engages the pin 158. Upon the rear end of the trigger is formed a cam nose 162 which engages the heel 147ᵃ on the sear, this nose swinging inwardly to disengage from the heel when the shoulder 148′ is released from the stud 116 on the firing pin, as will be later pointed out, the trigger striking the rear wall of the trigger slot 90′ in the plate 90 immediately after the nose 162 clearing the heel 147ᵃ and limiting the upward movement of the nose in a position in which forward pressure of the heel on the nose swings the latter downward by reason of the reaction of the spring pressed pin 159′. The trigger when it is pulled backward on firing is firm in its place in the raceway, while the sear slides back with the receiver by means of the sear head in the accommodated aperture in the bottom wall of the receiver. This backward movement of the sear causes it to ride off the cam nose 162 of the trigger so that the sear with its head again sets itself immediately in position to catch the front stud of the firing pin when the latter slides forward again with the breech-closing parts.

When the sear moves forward, it takes the trigger along with it by means of the channeled portion of the sear, close to its rear end, fitting over the trigger head 156′ and by means of the slanting slot 157 in the trigger, which slot permits the trigger to slide forward with the sear. As soon as the trigger is released its cam nose 162 is pushed again immediately under the heel 147ᵃ of the sear by means of the spring pressed pin 159, swinging the trigger around so that the latter is ready to be pulled again.

To enable the breech-bolt to be opened manually, a rod 163 (see Figures 1 to 7, 20, 23 to 27, and 66 to 68) extends along the side of the receiver opposite to that in which the accelerating lever 129 is mounted, and has fixed thereon, a short distance from its forward end, a lug 166 which is adapted to engage the carrier 99 in the receiver, when the rod is pulled rearwardly. This rod is mounted in a guide 164 of arciform shape in cross section formed on the right side of the receiver, in which it has both sliding and rotary movement, and is provided with a handle 165. The receiver is longitudinally slotted as at 164′ to accommodate this lug 166, while the carrier 99 is faced off at one side to present a forwardly facing shoulder 167 against which the lug 166 bears. When the rod 163 is pulled backward by its handle 165 it therefore takes the carrier 99 along and as the inside lug of the carrier upon its longitudinal movement slides in the spiral slot 107 of the breech-bolt 100, it therefore turns the breech bolt, and disengages the threads 109, 110. Therefore, this rod 163 performs all the functions the accelerating lever 129 does in the firing of a cartridge.

The action spring 127 pushes the breech-closing parts forward again and the carrier with its shoulder 167 bears on the lug 166 of the rod 163 thus taking this rod along with it to the forward firing position.

The rod 163 is yieldingly held in its forward position by means of a spring pressed detent 168, located in a grove in the wall of the receiver and engaging an arcuate notch 169 cut in the side of the rod 163 near the front end thereof. To assist in maintaining the rod against any lateral or bending movement as it is pulled backward, it is formed on its inner side with a dove-tail groove 163′ which extends from the rear end substantially half the length thereof, this groove being alined with a complementary lug 169ᵃ projecting laterally from the end-piece 93 so as to engage said lug as the rod moves backward.

When the rod 163 is in its foremost position in its given place it is adapted to be rotated by hand, the handle 165 swung upward nearer to the receiver about 100 degrees as shown in dotted lines in Fig. 6.

Thus, a double safety of the firing device against a non-desired function is assured. This safety device is effected by the arcuate lug 170 on the rod 163, which lug 170 is curved concentric to the rod 163 and is fixed on a flange-member 163ᵃ projecting from the rod diametrically opposite to the lug 166. This lug 170 slides outside over the receiver and is adapted to be moved by rotation of the rod 163 into engagement with the shoulder 167 on the carrier 99 through a cut-out portion on the receiver and replaces the lug 166 on the shoulder of the carrier, which lug 166 turns away from the carrier to a position beneath the rod 163.

By swinging the handle 165 upward the rod 163 with the lug 170 is rotated and pulled backward a short distance (6 millimeter) (by means of the front end of the flange member 163ᵃ sliding over a spiral area 171 on the receiver) and then pushed forward again a shorter distance (2 millimeter). This rod, thus moved back the difference of the two distances, (4 millimeter) moves the carrier 99 backward also which latter, by means of its inside lug 102 being in engagement with the spiral slot 107 in the breech-bolt 100, rotates the latter with the firing pin 112 whose front stud 116 is thus rotated away from registry with the notch 148ᶜ on the sear head 148 to a position on the sear head where it is impossible to fire.

If this described safety device should fail by breaking of any part of the firing device, the second safety device would then come into function, inasmuch as the projection 102′ on the inside lug 102 in the carrier 99 (which latter is held back a short distance) (4 millimeter) would stop the forward movement of the firing pin (by means of the shoulder of the tubular portion 112ᵇ of the firing pin abutting against this projection of the inside lug 102 in the carrier 99) before said firing pin could reach the percussion cap of the cartridge, (see Figure 3).

A double safety device is thus provided.

The rod 163 is independent from the movements of the breech-closing parts and therefore, on firing of a cartridge, it is firm in its place by means of the above described spring-pressed detent in the receiver, and when rotated to safety position, it snaps forward in its given place, therefore it must be pulled backward first before it can be rotated again (its handle swinging downward) to firing position.

When the rod is in its extreme forward position, the flange-member 163ᵃ engages in a rearwardly facing notch 171 formed, in the forward end of the arciform guide 164 which has the lips thereof continued around to completely encircle the rod.

To enable the rod to be rotated after being shifted slightly backward, as set forth, the guide 164 is cut away as at 164ᵃ, this cut-out portion extending inwardly through the wall of the receiver 87 as shown to accommodate the arcuate lug 170, (see Figures 5 and 6).

When the rod 163 has been rotated it is moved slightly forward (not however to its extreme forward position) until the detent 168 engages in a second notch 173 in the rod, just to the rear of and at right angles to the notch 169.

The foregoing description, taken in connection with the drawings, will readily enable those skilled in the art to understand the manner of assembly of the plate 90 with its magazine and the raceway 83 on the stock 80 and of the sear 147 and trigger 156 in the raceway, the accelerating lever 129 being mounted in the raceway prior to placing the latter in the stock. The manner of assembly of the other parts will be now explained. The receiver 87 is first laid upon the raceway 83 with the barrel 88 accommodated in the usual manner in the groove in the stock, the receiver being inserted downwardly with the grooved lugs 86, 86′ thereof to the rear of the corresponding lugs 85, 85′ on the raceway, the lever 129 being entered into the recess 128 in the side of the receiver, and the stock being suitably recessed to receive the lugs on the latter. The rod 163 is then inserted in position, the lug 166 being first passed through the enlargement 164ᵃ at the front end of the slot 164 and the rod pushed forward in the guide 164 until the flange 163ᵃ bears in the notch 171. The carrier 99, breech-bolt 100 and firing pin 112 are then inserted in the receiver from the rear end, having previously been assembled as follows: The firing pin is inserted through the carrier to a position with the projection 102 in the carrier located betw en and in a common plane with the studs 116 and 117 on the firing pin. While the parts are held in this position, the breech-bolt is inserted between the carrier and firing pin, the studs 116, 117 and projection 102 passing through the slot 118 in the breech-bolt until the projection 102 registers with the spiral slot 107 in the breech-bolt, the carrier being then partially rotated to bring the projection into spiral slot. The main spring 123 is then inserted into the tubular portion at the rear end of the firing pin, and the end-piece 124 inserted in the rear end of the breech-bolt as previously described. The carrier 99 is then rotated by hand in an opposite direction to that just referred to until the projection 102 is in alinement with the arcuate notch 107ᵃ in the breech-bolt at the entrance to said slot 107. By reason of the engagement of the rear stud 117 on the firing pin with the rear edge of the carrier 99, the spring 123 is compressed as the carrier is rotated backward and in consequence the pressure of the spring causes the projection 102 to bear yieldingly in the notch 107ᵃ and hold the carrier and breech-bolt against rotary displacement. It may be said that the pressure of the spring 123 causes the projection 102 to hug the forward wall of the spiral slot 107 when the carrier is rotated by hand as just set forth so that the projection 102 slips into the notch 107ᵃ immediately, the parts have reached the proper position, the engagement of the projection with the notch being readily felt by the hand holding the carrier. When the carrier and breech-bolt are so relatively positioned, the groove 100ᵃ in the forward part of the breech-bolt will be in registry with the lug 134 on the inturned flange 87′ of the receiver when the projection 101 on the carrier is alined with the groove 103 in the bottom of the receiver.

The breech-bolt carrier 99 breech-bolt 100, firing pin 112, main spring 123 and end-piece 124 are the previously described breech-closing parts and, properly assembled as just set forth, form a unit which is adapted to be inserted from the rear into the receiver 87, the exterior lug 101 on the carrier engaging the groove 103 in the receiver.

Dismounting of the assembled breech-closing parts is as follows: First the carrier 99 is rotated to enable its interior lug 102 to slide to the front end of the spiral groove 107 in the breech-bolt 100 then the end-piece 124 is pressed inward against the main spring 123 until the notch 125′ on one of the projections 125 of the end-piece disengages from the tit 126′ on one of the projections 126 at the enlarged rear end of the breech-bolt boring 118, thus enabling it to be rotated partially, whereby the pressure of the spring 123 forces said end-piece out from the rear end of the breech-bolt, the spring 123 slides out from the tubular portion of the firing pin and the carrier and firing pin are easily removed from the breech-bolt.

When assembling the firearm, the rod 163 must be in its place before the assembled unit is inserted from the rear into the receiver. If, by mistake, the unit is inserted into the receiver before the rod is in its place, said unit must be removed again therefrom. This is readily done by hitting the butt end of the stock 80 of the firearm against any object of resistance, say the human shoulder, thus recoiling the receiver, whereby the breech-bolt is unlocked through co-operating movements of the lever 129 and the carrier and the breech-bolt and said unit slides to the rear end of the receiver, being easily removed therefrom.

When the rod 163, the assembled unit, and the action spring 127 are in their proper positions, the end-piece 93 is then screwed into the rear end of the receiver 87 and the downwardly projecting lever 95 of the end-piece 93 is pressed inward on its especially adapted portion and snapped into the recess 96′ in the groove 96 on the raceway 83, thus holding the parts in position. The rod 163 is then pulled backward whereby the breech-closing parts compress the action spring until the bolt-stop holds the breech-bolt in retracted position, a cartridge is laid on top of the follower 138, the thumb-piece on the bolt-stop is then depressed whereby the action spring 127 pushes said unit or breech-closing parts forward to the firing position, at the same time inserting the cartridge into the barrel and the rifle is ready for firing.

Dismounting of the firearm is as follows: First, the end-piece 93 is unscrewed by pressing the downwardly projecting lever 95 out of the recess 96′ in the groove 96 on the raceway 83 then rotating said lever which rotates also the end-piece, thus unscrewing it from the rear end of the receiver. The rod 163 is then pulled backward, thus unlocking the breech-bolt 100 from the engaging screw threads 110 on the receiver and the action spring 127 together with the complete unlocked breech-closing parts slide to the rear end of the receiver and are easily removed therefrom.

The barrel with receiver is then moved backward until its lugs 86 and 86′ disengage from the corresponding lugs 85 and 85′ on the raceway, whereby the barrel with receiver is then taken off the raceway. The sear 147 (laying freely in the channel portion of the raceway) is then withdrawn therefrom, the raceway is then removed from the stock 80 after the screws 81 and 82 are disengaged therefrom, thus permitting an easy removal of the lever 129 and the trigger 156 (which seldom needs be done).

It is to be noted that when the carrier reaches its forward position the shoulder 167 thereon is adjacent the lug 166 on the rod 163 while the front edge thereof is closely adjacent the end of the lever 129 with the nose 129′ on the latter closely adjacent the rear wall of the recess 128 in the receiver. Also it may be stated that when the carrier and breech-bolt are pushed forward, the engagement of the exterior projection 101 on the carrier with the spiral portion 104 of the groove 103 causes the interior projection 102 to ride off the rounded notch 107ᵃ into the spiral slot 107 so that the breech-bolt is rotated to lock the same. As the breech-bolt is moved forward the stud 116 on the firing pin 112 engages the shoulder 148′ on the sear head 148.

The operation of the rifle is as follows: It is assumed that the breech-bolt is closed with a cartridge in the barrel 88 and that the safety device is not in operating position. When the trigger 156 is pulled, the nose 162 thereon engages and lifts the rear end of the sear 147 which swings, first upon the ridge 154 and then on the ridge 155, causing the head 148 to be depressed until the notch 148ᶜ therein registers with the stud 116 on the firing pin, releasing the latter which is moved forward by its spring 123 and strikes and explodes the cartridge. The parts are so proportioned that the second ridge 155 engages the bottom of the receiver just prior to the disengagement of the shoulder 148 from the firing pin. The front ridge 154 abuts always on the bottom of the receiver by means of the sear head being held upward by the spring 149 and by pulling of the trigger 156, as just set forth, the rear part of the sear 147 is raised until the second ridge 155 abuts on the bottom of the receiver while the sear head 148 is depressed correspondingly, but still in engagement with the front stud on the firing pin, just enough to permit afterwards only a slight pressure on the trigger 156 to release the said front stud of the firing pin. The principle of this device is to control the firing device and to permit of very accurate shooting.

The pulling of the trigger, to depress the sear head, ensures a slight additional movement of the trigger, which causes the nose 162 on the latter to slip off the heel 147ᵃ on the sear so that the latter is released to the action of the spring 149 thereon. Also the engagement of the inclined surfaces 148ᵇ on the sear and 87ᵏ on the receiver cause the sear to move backward when the head is depressed, forcing the firing pin backward against its spring 123 so that when the shoulder 148′ disengages from the stud 116 the resistance to the movement of the sear offered by the spring 123 ceases and the sear is snapped downward and backward.

The recoil of the explosion causes the barrel 88 with the receiver 87 to move backward a short distance (5 millimeter) together with the complete breech-closing parts in the receiver, the grooved lugs 86, 86′ sliding in engagement with the lugs 85, 85′ on the raceway. As the barrel with receiver recoils, the screw threads 109 on the breech-bolt are interlocked with the screw threads 110 on the receiver. The recoiling barrel with the receiver is then arrested by means of the downwardly projecting lever 95 on the end-piece 93, the lowest part of the lever fitting into the recess 96′ on the raceway. As the barrel with receiver recoils, the rearwardly facing wall of the recess 128 on the receiver engages the nose 129′ on the accelerating lever 129, swinging the latter backward and by reason of the increased distance of the end 129ᵃ of the lever from the fulcrum point, it will be obvious that the end will move at an increased speed and since this end is in engagement with the carrier 99 it is obvious that the latter will be moved backward upon the breech-bolt 100 which is still held locked by the threads 109.

As the carrier moves backward on the breech-bolt, its interior projection 102 engages the rear wall of the spiral slot 107 in the breech-bolt, causing it to be rotated in a direction to withdraw the threads on the breech-bolt from the threads on the receiver. Just as the threads are freed, the lug 134 on the receiver comes into registry with the longitudinal groove 100ᵃ in the side of the breech-bolt. The breech-bolt, being thus unlocked, moves backward relatively to the receiver, and the lug 134 on the receiver engages the groove 100ᵃ and holds the breech-bolt against rotation during its entire backward and forward movement. The initial movement of the carrier will have rotated the breech-bolt sufficiently to bring the interior projection 102 on the carrier to a point adjacent the rounded notch 107ᵃ on the front wall of the slot 107 and the exterior projection 101 to the beginning of the spiral portion 104 of the groove 103 in the receiver so that as the parts continue their backward movement in the receiver the engagement of the projection 101 in the spiral part of the groove 103 rotates the carrier a sufficient distance to bring the projection 102 into registry with the rounded notch 107ᵃ, the carrier and breech-bolt moving backward and forward in the receiver in this position until the exterior projection 101 again engages the spiral part of the groove 103. As will be apparent, action spring 127 is compressed during the backward movement of the breech-bolt and carrier and throws these parts forward again. The length of the breech-bolt is so proportioned with respect to the portion of the receiver to the rear of the inturned flange 87′ that when the breech-bolt has moved completely back, the forward end of the lug 134 on the receiver is projecting beyond the forward end of the breech-bolt so that as the breech-bolt moves back, carrying with it the empty shell which is engaged by the hooked end of the extractor 132, the rim of this shell strikes the forward end of the lug 134 and the shell is thrown upward and to one side through the ejecting opening in the receiver, a fresh cartridge moving into place and being pushed into the barrel as the breech-bolt moves forward under the action of spring 127. As the breech-bolt and carrier move forward, the action above described of the carrier and breech-bolt is reversed and the breech-bolt is locked by the final forward movement of the carrier.

As above pointed out the sear 147 is immediately released for upward movement when the trigger is pulled, being thrown by the spring 149 upward again. The slot 157 in the trigger allows of a forward movement of the trigger when the sear is again thrown forward by the forward moving receiver.

When the carrier starts to move backward, as above pointed out, it carries the firing pin 112 back with it (see Figures 75 to 77) by reason of the engagement of the rear stud 117 with the recessed rear wall of the carrier. The rotation of the breech-bolt during this movement causes the firing pin to rotate also so that the stud 116 rides backward in a spiral path across the inclined face of the sear head 148, the spiral edge 121 on the carrier with which the rear stud 117 engages, causing the firing pin to have an increased movement over the carrier by riding up such inclined edges as the firing pin rotates. The firing pin is thus drawn completely back in the breech-bolt before the latter is unlocked and moves backward and forward in the breech-bolt in this retracted position so that when the breech-bolt moves forward again, the shoulder 148′ does not have to receive the impact of the pin when the breech-bolt reaches its forward position, this impact being taken on the rear edge of the carrier from the rear stud 117 on the firing pin. As the breech-bolt reaches its forward position, the front stud 116 is closely adjacent the shoulder 148′ so that as the breech-bolt rotates to locking position and the carrier moves away from the rear stud 117, the front stud 116 engages the shoulder 148′ on the sear without any impact or blow. It will be noted that the stud 116 first engages the shoulder on the side away from the notch 148ᵉ and then swings to a position adjacent such notch, as the breech-bolt rotates to locking position.

As previously described, when it is desired to set the firing pin in safety position, the rod 163 is pulled backward a short distance. This movement of the rod causes the carrier to move backward in unison therewith by reason of the engagement of the lug 166 with the shoulder 167 on the carrier. As the carrier moves backward it causes a rotative movement to be given the breech-bolt as above pointed out, causing the firing pin to rotate also and the stud 116 to swing to one side of the notch 148ᵉ in the sear head 148 (see Figure 78). The rod 163 is then rotated about 100 degrees by swinging its handle upward, the arcuate lug 170 moving into engagement with the shoulder 167 on the carrier. The rod is then pushed a slight distance forward, not however to its original forward position, until the detent 168 engages in the notch 173 in the rod 163 and the lug 166 moves into the notch 172 in the guide 164. The rod is held against rotative movement in one direction by means of the flange 163ᵃ on the rod, engaging the side of the receiver, and in the opposite direction by engagement of the lug 166 with the bottom wall of the notch 172 in the guide 164.

Figure 78:
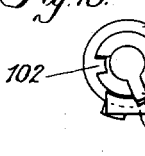
Figure 78 to 81 are diagrammatic end views showing the different relative rotative positions of the breech-bolt with respect to the carrier and the sear.
Figure 79:
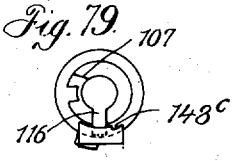
Figure 77:
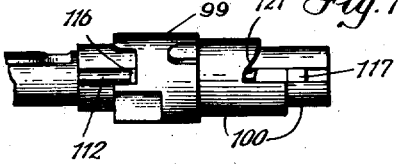
Figure 80:
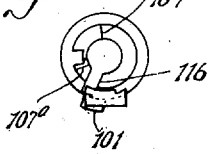
Figure 81:
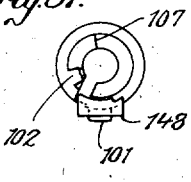
Figure 73:
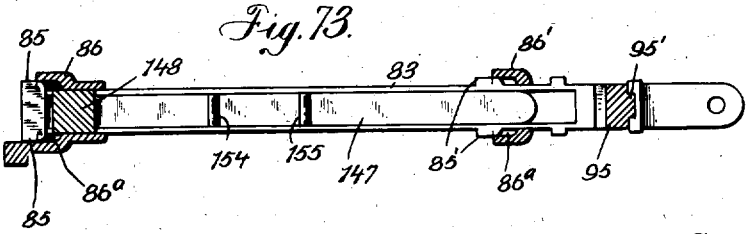
Figure 73 is a horizontal section on line 73—73 of Figure 72.

With the regular army cartridge, the rifle works perfectly as a self-loader both with or without fixed bayonet. With a cartridge having a powder charge reduced to a minimum, the rifle would not operate as a self-loader, but as a hand-loader by means of the rod 163. In Figures 78 to 81 the different rotative positions of the breech-bolt 100 with relation to the carrier 99, and of the firing pin 112, which rotates with the breech-bolt, with relation to the sear 147 are indicated. Figure 78 shows the parts in position ready for firing, with the stud 116 on the firing pin in juxtaposition with the notch 148ᵉ on the sear head 148. Figure 79 shows the parts with the safety device set with the breech-bolt partly rotated so as to move the stud 116 out of juxtaposition to the notch 148ᵉ. Figure 80 shows the breech-bolt rotated to unlocked position by the backward movement of the carrier; and Figure 81 shows the carrier as partially rotated by engagement with the spiral portion 104 of the groove 103 in the receiver so as to aline the projection 102 in the carrier with the rounded notch 107[a] in the slot 107 in the breech-bolt.

What I claim is as follows:—

1. In a recoil operated firearm, the combination with a stock, of a raceway fixedly attached thereto, a recoilable receiver upon said raceway, a breech-bolt carrier rotatable and slidable in said receiver, a breech-bolt upon said carrier, and means whereby upon recoil of the receiver the carrier is caused to impart rotative movement to the breech-bolt and rotate itself upon the latter in a direction opposite to the direction of rotation of the breech-bolt, including means carried by the raceway to transmit the recoil of the receiver to said carrier.

2. In a recoil operated firearm, the combination with a stock, of a raceway fixedly attached thereto, a recoilable receiver upon said raceway, a breech-bolt carrier rotatable and slidable in said receiver, a breech-bolt upon said carrier, means whereby upon recoil of the receiver the carrier is caused to impart rotative movement to the breech-bolt and rotate itself upon the latter in a direction opposite to the direction of rotation of the breech-bolt, said means including a lever pivoted to said raceway and actuated by said receiver upon recoil of the latter.

3. In a recoil operated firearm, the combination with a stock of a raceway fixedly attached thereto, a recoilable receiver upon said raceway, a breech-bolt carrier rotatable and slidable within said receiver, a breech-bolt upon said carrier and means carried by said raceway acting upon said carrier and operated by said receiver for causing upon recoiling of the latter an accelerated motion of said carrier and breech-bolt, and means for causing rotation of said carrier, during the sliding movement thereof.

4. In a recoil operated firearm, the combination with a stock, of a raceway fixedly attached thereto, a recoilable receiver upon said raceway, a breech-bolt carrier rotatable and slidable within said receiver, a breech-bolt upon said carrier and means carried by said raceway acting upon said carrier and operated by said receiver for causing upon recoiling of the latter an accelerated motion of said carrier and breech-bolt, said means including a lever pivoted to said raceway, and means for causing rotation of said carrier, during the sliding movement thereof.

5. In a recoil operated firearm, the combination with a stock, of a raceway fixedly attached thereto, a recoilable receiver upon said raceway having an interior groove comprising a spiral portion and a straight portion running in a direction parallel to the longitudinal axis of the receiver, said receiver being furthermore provided with interior mutilated screw threads, a breech-bolt carrier having a fixed projection seated in said groove, a breech-bolt upon said carrier provided with exterior screw threads adapted to mesh with the threads of said receiver, said breech-bolt having a spiral slot therein presenting a transverse wall at one end, an interior projection upon said carrier, engaging in the said spiral slot, and means carried by said raceway whereby the recoil of said receiver is transmitted to said carrier to cause said carrier to rotate said breech-bolt through the engagement of the said interior projection with the wall of the said spiral slot and to rotate upon the breech-bolt through engagement of the said exterior projection with the spiral portion of the said groove in the receiver.

6. In a recoil operated firearm, the combination with a stock, of a raceway fixedly attached thereto, a recoilable receiver upon said raceway having an interior groove comprising a spiral portion and straight portion running in a direction parallel to the longitudinal axis of the receiver, said receiver being furthermore provided with interior mutilated screw threads, a breech-bolt carrier having a fixed projection seated in said groove, a breech-bolt upon said carrier provided with exterior screw threads adapted to mesh with the threads of said receiver, said breech-bolt having a spiral slot therein presenting a transverse wall at one end, an interior projection upon said carrier engaging in the said spiral slot, and means carried by said race way whereby the recoil of said receiver is transmitted to said carrier to cause said carrier to rotate said breech-bolt through the engagement of the said spiral slot and to rotate upon the breech-bolt through engagement of the said exterior projection with the spiral portion of the said groove in the receiver, said means including a lever pivoted to said raceway.

7. In a recoil operated firearm, the combination with a stock, of a raceway fixedly attached thereto having a recess, a recoilable receiver upon said raceway, an end-piece upon said receiver, a lever pivoted to said end-piece having its free-end seated in said recess, and a spring between said end-piece and said lever.

8. In a firearm, the combination with a receiver, of a breech-closure slidably and rotatably disposed therein, a firing pin within said breech-closure having a stud, a sear, having a shoulder presenting high and low portions in a transverse direction, said stud engaging, when the piece is cocked, the lower edge of said shoulder, means for shifting and simultaneously rotating said closure and the pin carried thereby whereby said stud is brought into engagement with the higher edge of said shoulder, and means for locking the elements in such positions whereby firing is prevented upon actuating said sear.

9. In a firearm, the combination with a mortised base plate, of a sear therein, having a shoulder at its front end and two ridges behind said shoulder, means, causing the first ridge behind said shoulder to abut against the receiver, and a trigger acting upon the rear end of said sear for elevating said rear end whereby said sear turns first upon the first ridge behind said shoulder and then upon the second ridge.

10. In a firearm, the combination with a base plate, of a trigger having a downwardly slanting slot, a pivot pin extending through said slot and into said base plate, a slanting shoulder in front of said trigger, and a spring pressed pin upon said trigger normally in engagement with the uppermost point of the slanting side of said shoulder.

11. In a recoil operated firearm, a stock, a raceway fixedly attached thereto, a recoilable receiver on said raceway, a breech-bolt carrier in the form of a sleeve, a breech-bolt having a rear portion and a reduced front portion, said sleeve fitting snugly in said receiver and said rear portion of said breech-bolt fitting snugly in said sleeve, said reduced front portion of said breech-bolt fitting snugly in a front portion of said receiver, cooperating tongue and groove devices in said receiver, sleeve and breech-bolt whereby said sleeve and said breech-bolt are guided and rotated during their longitudinal movement in said receiver, means to cause said carrier to slide longitudinally of said receiver upon recoiling of the latter, cooperating means carried by said carrier and receiver to rotate said carrier, during its sliding movement and said tongue and groove devices holding said sleeve and said breech-bolt in their relative positions while sliding and rotating in said receiver.

12. In a recoil operated firearm, a stock, a raceway fixedly attached thereto, a recoilable receiver on said raceway having a groove, a breech-bolt carrier in the form of a sleeve and slidable and rotatable in said receiver, said sleeve having an exterior lug adapted to engage said groove in said receiver and slide therein whereby said sleeve is guided by its longitudinal movement in said receiver, means to cause said carrier to slide longitudinally of said receiver upon recoiling of the latter, cooperating means carried by said carrier and receiver to rotate said carrier, during its sliding movement and said sleeve having also an interior lug, a slidable and rotatable breech-bolt in said sleeve and also in said receiver, adapted to lock and unlock with said receiver, said breech-bolt having a spiral slot adapted to engage said interior lug in said sleeve, means, whereby backward movement of said sleeve causes said breech-bolt to rotate in one direction unlocking from said receiver, and whereby forward movement of said sleeve causes said breech-bolt to rotate in opposite direction, interlocking with said receiver.

13. In a recoil operated firearm, a stock, a raceway in said stock, a recoilable receiver upon said raceway, an accelerating lever pivoted at its lowest end in said raceway, the upper part of said lever projecting into a recess in said receiver and being guided therein, a slidable and rotatable breech-bolt carrier in said receiver, a slidable and rotatable breech-bolt in said carrier and interlocked with said receiver, cooperating means carried by said carrier and receiver to cause rotation of said carrier when it slides longitudinally of said receiver, said accelerating lever being in engagement with said receiver and said carrier whereby backward movement of said receiver causes said breech-bolt to unlock from said receiver through cooperating movements of said accelerating lever, carrier and breech-bolt.

14. In a recoil operated firearm, a stock, a raceway in said stock, a recoilable receiver upon said raceway, an accelerating lever of curved shape pivoted at its lowest end in said raceway, its upper part projecting into a recess in said receiver and being guided therein, a slidable and rotatable breech-bolt carrier in said receiver, the upper front part of said accelerating lever being in engagement with said carrier and the lower rear part of said lever being in engagement with said receiver whereby backward movement of said receiver causes said lever to swing with progressive accelerating velocity and give said carrier an increased speed during its backward movement, cooperating means carried by said carrier and receiver to cause rotation of said carrier when it slides longitudinally of said receiver.

15. In a recoil operated firearm, a stock, a raceway in said stock, a receiver slidable on said raceway, co-operating members on said raceway and receiver holding said receiver on said raceway, said members being adapted to disengage upon sufficient rearward movement of said receiver on said raceway, and a removable end-piece on said receiver having a longitudinally swinging lever pivoted therein and being in engagement with the said raceway and preventing sufficient rearward movement of said receiver to disengage it from the said raceway, and a spring pressed element on said end-piece interlocking with said raceway to prevent disengagement of said end-piece from said receiver.

16. In a recoil operated firearm, a stock, a raceway in said stock, said raceway having a recess at its upper rear part, a receiver slidable on said raceway, co-operating members on said raceway and receiver holding said receiver on said raceway, said members being adapted to disengage upon sufficient rearward movement of said receiver on said raceway, and a removable end-piece on said receiver having a downwardly projecting lever pivoted at its upper end in the rear part of said end-piece, said lever having a portion, forming a thumb-piece adapted to press said lever inwardly, said lever having also a projection at its lower end, fitting into said recess in said raceway, a spring between said end-piece and said lever holding said lever and said end-piece apart and interlocking said lever with said raceway, to prevent disengaging movement of said end-piece from said receiver, said spring pressed element serving to cushion the recoil of said receiver and barrel, and said spring, carried in the lower part of said lever serving also to push said recoiled receiver with barrel forward again.

17. In a recoil operated firearm, a raceway, a receiver upon said raceway having a groove comprising a straight portion and a spiral portion, a breech-bolt carrier in said receiver having an exterior lug engaging said groove in said receiver, said carrier having also an interior lug, a breech-bolt in said carrier and said receiver having a spiral slot and a notch in said spiral slot adapted to engage said interior lug in said carrier, means for causing longitudinal movement of said carrier upon the recoil of said receiver and means whereby backward movement of said carrier causes said exterior lug to slide in said spiral portion of said groove in said receiver whereby said carrier is rotated upon said breech-bolt, said interior lug sliding in said spiral slot in said breech-bolt and said interior lug in said carrier engaging said notch in said spiral slot in said breech-bolt.

18. In a recoil operated firearm, a raceway, a receiver upon said raceway having a groove comprising a straight portion and a spiral portion, a breech-bolt carrier in said receiver having an exterior lug engaging said groove in said receiver, said carrier having also an interior lug and a rear edge, a breech-bolt in said carrier and said receiver having a spiral slot and a notch adapted to engage said interior lug in said carrier, a firing pin in said breech-bolt having a rear stud, engaging said rear edge on said carrier, a main spring locked in said firing pin, means for causing longitudinal movement of said carrier upon the recoil of said receiver and means whereby backward movement of said carrier causes said exterior lug to slide in said spiral portion of said groove in said receiver whereby said carrier is rotated upon said breech-bolt said interior lug sliding in said spiral slot in said breech-bolt and said interior lug in said carrier engaging said notch in said spiral slot, whereby said locked main spring in said firing pin is compressed and causing said interior lug to bear yieldingly in said notch, thereby holding said carrier and said breech-bolt against rotary displacement.

19. In a recoil operated firearm, a stock, a channeled raceway in said stock, a partially inwardly channeled sear slidable in said raceway, said sear having at its rear end a downwardly extending arcuate heel, a trigger pivoted in said raceway having at its rear part a cam nose, adapted to engage said arcuate heel on said sear, said trigger having also a downwardly slanting slot, a pivot pin extending through said slot, said trigger having also a forwardly extending and upwardly curved finger at its front part, adapted to bear against the bottom of said raceway, and a spring pressed pin in its head, adapted to swing said trigger around by releasing it whereby said cam nose moves downward, said forwardly extending and upwardly curved finger bearing against the bottom of said raceway and limiting the downward movement of said cam nose, whereby the front end of said downwardly slanting slot in said trigger engages said pivot pin, extending through said slot, and means, whereby pulling of said trigger causes said cam nose to disengage from said arcuate heel on said sear.

RUDOLF RYCHIGER.